Feb. 2, 1937. F. P. PETMECKY 2,069,679
BICYCLE
Filed Sept. 12, 1934  2 Sheets-Sheet 2
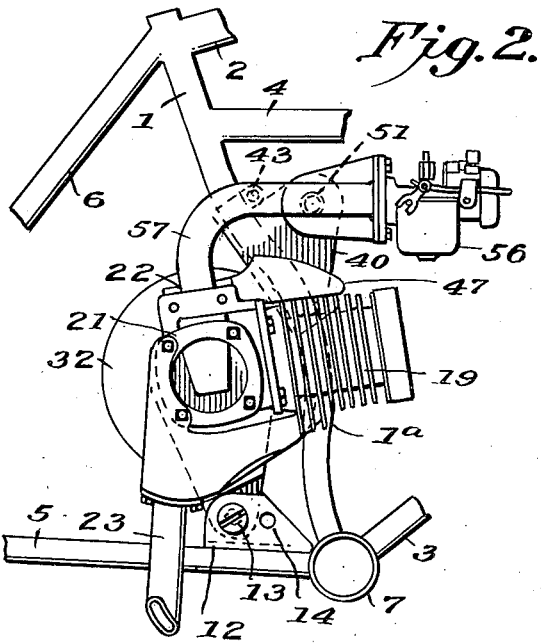
Fig. 2.
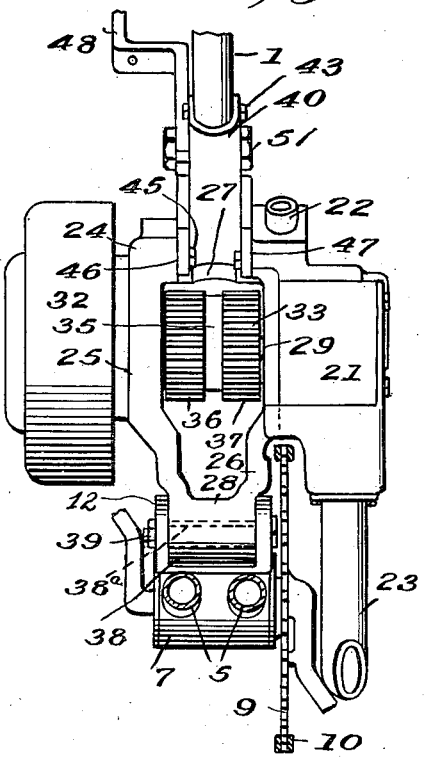
Fig. 4.
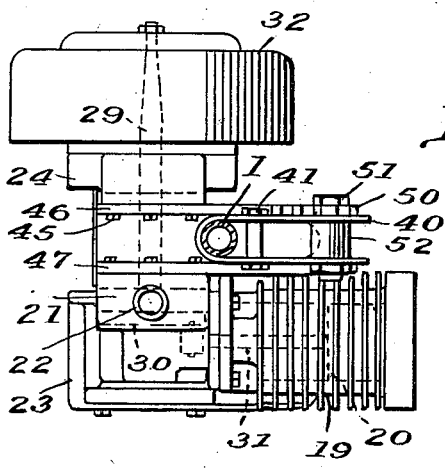
Fig. 3.
Fig. 5.
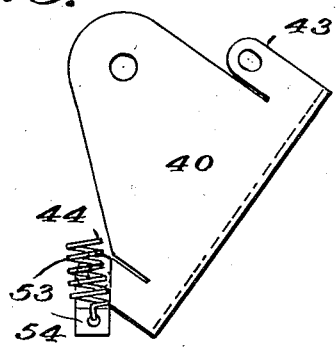
Fig. 6.
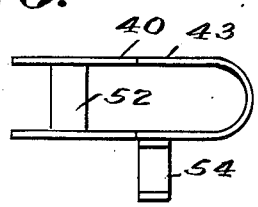
Inventor
Fred P. Petmecky
By Milans & Milans.
Attorneys Patented Feb. 2, 1937

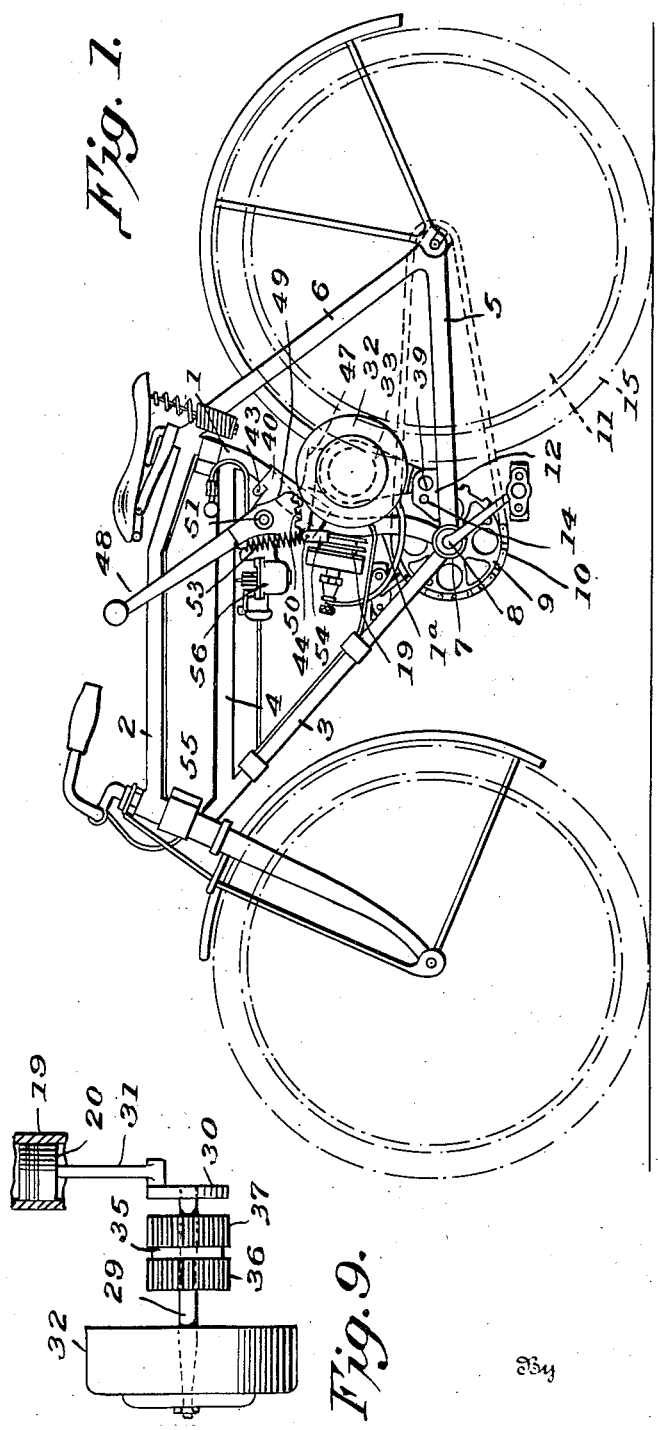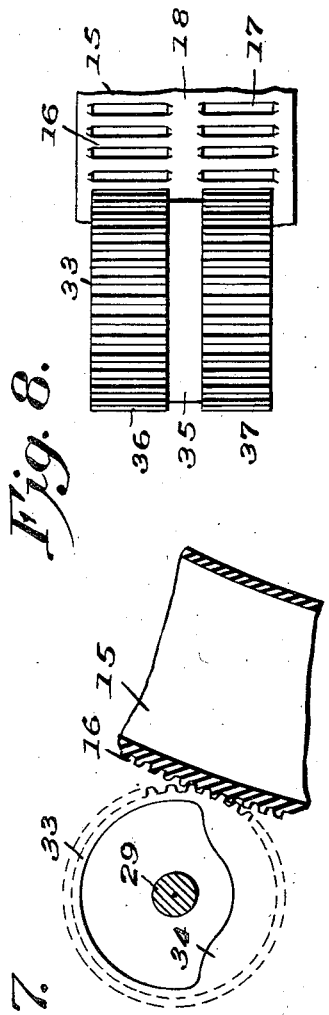

2,069,679

UNITED STATES PATENT OFFICE 2,069,679

BICYCLE

Fred P. Petmecky, Austin, Tex., assignor to American Power-Cycle Corporation, Frederick, Md.

Application September 12, 1934, Serial No. 743,735

20 Claims. (Cl. 180—33)

This invention relates to improvements in bicycles and more particularly to an improved frame construction and motor attachment.

An object of the invention is to provide an improved bicycle frame of simple, strong construction, which will permit of the ready attachment of a motor thereto and allow for shifting the motor into and out of driving relation with the rear wheel, whereby the machine may be used as a bicycle or motorcycle.

Another object of the invention is to provide an improved motor attachment of simple, light, compact construction that can be easily installed on a bicycle frame.

Other objects of the invention are to provide an improved form of drive connection with the rear wheel of a bicycle; to provide for mounting a motor on the bicycle frame to allow the same to be shifted relatively to the rear wheel to move it into and out of driving relation with the rear wheel; and to provide means of a simple, efficient nature conveniently located for controlling the shifting of the motor into and out of driving relation with the rear wheel.

The invention, with other objects and advantages thereof, and the particular construction, combinations and arrangements of parts comprising the same will be understood from the hereinafter contained detailed description, when considered in connection with the accompanying drawings forming part hereof and illustrating one embodiment of the invention.

In the drawings:

Figure 1 is a side elevation of a bicycle having a frame and a motor attachment constructed in accordance with the present invention.

Fig. 2 is a fragmentary side elevation looking from the other side of the machine.

Fig. 3 is a top plan view of the motor and its supporting member or frame.

Fig. 4 is a rear elevation of the motor attached to the bicycle frame.

Fig. 5 is a detail view of the bracket on the seat mast.

Fig. 6 is a top plan view of the bracket shown in Figure 5.

Fig. 7 is a detail view of the drive roller and a portion of the tire tread.

Fig. 8 is a top plan view of the drive roller and a portion of the tire tread.

Fig. 9 is a detail view of the engine shaft and associated parts.

While a specific embodiment of the invention is illustrated in the drawings, it will be understood that minor changes and variations may be made in the particular construction shown, and the invention may be embodied in other forms as will appeal to those skilled in the art and falling within the scope of the appended claims, without departing from the spirit of the invention.

The invention comprehends a bicycle provided with a frame of a construction providing for the ready installation of a motor thereon arranged and movable relatively to the rear wheel of the bicycle to provide for shifting the motor to carry a drive pulley thereon into and out of driving relation with the rear wheel.

Referring to a detailed description of the particular embodiment of the invention illustrated in the drawings, the bicycle shown has a frame comprising a seat mast 1, upper and lower reach bars 2, 3, a brace bar 4, pairs of lower and upper rear truss members 5, 6, and a crank hanger 7. 8 designates the crank, 9 and 10 the driving sprocket and chain, and 11 the rear wheel.

In accordance with the present invention, the seat mast 1 has intermediate its ends a forwardly curved portion 1ª, and a bracket 12 is provided on the lower truss members 5 in rear of the crank hanger. The bracket 12 is shown U-shaped in cross section and formed as a separate part secured to the lower truss members 5 by welding or brazing. The sides of the bracket 12 are provided with pairs of aligned bolt apertures 13, 14. The rear wheel 11 is equipped with a rubber tire 15 that has a tread provided with series of teeth 16, 17 disposed at opposite sides of a plain central portion 18.

The motor that is provided for attachment to the bicycle frame is an internal combustion motor. The motor proper is of conventional form. 19 and 20 designate the cylinder and piston of the motor, 21 the crank case, 22 the fuel intake and 23 the exhaust pipe. In accordance with the present invention, the engine is provided at one side of the crank case with a supporting frame designated generally by the numeral 24. Said supporting frame is rigidly connected with the crank case and is shown as comprising an outer side wall 25, an inner side wall portion 26, and upper and lower wall portions 27 and 28. The engine shaft 29 extends across the side frame 24, being supported in bearings on the outer side wall 25 thereof and a side wall of the crank case. On the inner end of the engine shaft within the crank case is a crank wheel 30 to which the piston rod 31 is connected. 32 designates a fly wheel on the outer end of the engine shaft. Fixed on the engine shaft within the opening in the side frame 24 is a drive roller 33. The drive roller, which is shown provided with a counterweight 34 cast therein, is provided in its outer face centrally thereof with an annular groove 35 and with series of teeth 36, 37 at opposite sides of the groove to cooperate with the series of teeth 16, 17, of the tread of the tire 15 of the rear wheel of the bicycle.

The supporting side frame 24 is provided at its lower portion with a lug 38 adapted to fit between the sides of the bracket 12 on the bicycle frame and to be pivotally connected with the bracket by a pivot pin or bolt 39 engaging a pair of the aligned apertures 13, 14, in the sides of the bracket, and a transverse bearing 38ᵃ of the lug, provision being thus made for attaching the motor to the bicycle frame in rear of the seat mast and crank hanger for rocking movement relatively to the rear wheel 15 of the bicycle to carry its drive roller 33 into and out of driving relation with the toothed tread of the tire 15 of the rear wheel.

It will be noted that the mounting of the motor on the rear truss members 5 close to the junction thereof with the crank hanger provides a strong construction. The forward curved portion 1ᵃ of the seat mast allows for sufficient movement of the motor to carry its drive roller into and out of driving relation with the rear wheel, and thus undue lengthening of the frame in the rear truss members 5, 6, is avoided.

Detachably secured on the seat mast 1 is a substantially U-shaped bracket 40, said bracket being clamped about the seat mast by bolts 41, 42, engaging apertured ear portions 43, 44, of the bracket. Secured to an upper inner face portion of the outer wall 25 of the side frame 24 and to the opposite wall portion of the crank case by screws 45 are plates 46, 47, adapted to make a snug sliding fit with the sides of the bracket 40 and prevent side play.

Manually controlled means is provided for shifting the motor into and out of driving relation with the rear wheel. This comprises a hand lever 48 pivotally connected intermediate its ends to the bracket 40 and having at its lower end a gear segment 49 meshing with a gear segment 50 on the plate 46. The hand lever is connected to the bracket by a bolt 51 engaging aligned apertures therein, the wall of one of the apertures being threaded. 52 designates a spacing member through which the bolt extends. A coiled spring 53 connected at opposite ends to the hand lever 48 and the bracket 40 at 54 acts to normally maintain the motor in the position shown in Figure 1 in driving relation with the rear wheel. As will be understood by moving the lever rearwardly from the position illustrated in Figure 1, the motor can be shifted forwardly to move its drive roller 33 out of engagement with the tire of the rear wheel.

55 designates a fuel tank and 56 is a carbureter, the latter being mounted on the bracket 40. The motor is provided with a flexible manifold 57. The flexible manifold, which may be constructed of rubber hose or other suitable material, as will be understood allows for rocking movement of the engine relatively to the carbureter.

It will be noted that by the particular construction and arrangement of parts hereinbefore set forth, a bicycle is provided in which provision is made for the ready attachment of a motor to the frame to be shifted into and out of driving relation with the rear wheel of the bicycle. A simple, efficient drive and motor shifting means are provided, and the construction as a whole is simple, strong and compact, and this is accomplished without undue lengthening of the frame in the truss members.

What I claim is:

1. The combination with a bicycle provided with a resilient tire on its rear wheel having a tread provided with two series of teeth formed by portions between series of spaced depressions in the face of the tread at opposite sides of a continuous central portion thereof, of a motor on the bicycle frame provided with a drive roller adapted to engage the tread of the tire, the outer face of the roller having an annular groove centrally of the sides thereof, and series of teeth at opposite sides of said groove to mesh with the series of teeth of the tire tread, said motor being shiftable relatively to the rear wheel to carry its drive roller into and out of engagement with the tread thereof, and manually controlled means for shifting the motor.

2. The combination with a bicycle provided with a frame including a seat mast having a forwardly curved portion intermediate its ends, upper and lower reach bars connected with each other and to the seat mast, of a motor provided with a drive roller to engage the peripheral portion of the rear wheel of the bicycle, the motor being pivotally mounted on the bicycle frame in rear of the crank hanger for rocking movement to carry its drive roller into and out of engagement with the rear wheel, and manually controlled means for shifting the motor.

3. The combination with a bicycle, of a motor provided with a drive roller to engage the peripheral portion of the rear wheel of the bicycle, the motor being pivotally connected with the lower rear truss members of the bicycle frame near the juncture of said members in rear of the seat mast, for rocking movement to carry its drive roller into and out of engagement with the rear wheel of the bicycle, and means for shifting the motor including a hand lever pivotally connected intermediate its ends with the seat mast of the frame and operatively connected at its lower end with the motor.

4. The combination with a bicycle, of a motor provided with a drive roller to engage the peripheral portion of the rear wheel of the bicycle, a supporting member for the motor secured thereto and pivotally connected to the bicycle frame in rear of the crank hanger, the motor being supported for rocking movement to carry its drive roller into and out of engagement with the rear wheel of the bicycle, and means for shifting the motor including a hand lever pivoted intermediate its ends to the frame and operatively connected at its lower end with said supporting member, and a spring acting to shift the motor into driving relation with the rear wheel.

5. The combination with a bicycle, of a motor provided with a drive roller to engage the peripheral portion of the rear wheel of the bicycle, a supporting member on the motor pivotally connected with the lower rear truss members of the bicycle frame near the juncture of said members in rear of the seat mast, the motor being supported for rocking movement to carry its drive roller into and out of engagement with the rear wheel of the bicycle, a gear segment on said supporting member, and a hand lever pivoted intermediate its ends with the seat mast and having at its lower end a gear segment meshing with the gear segment of the supporting member.

6. The combination with a bicycle, of a motor provided with a drive roller to engage the peripheral portion of the rear wheel of the bicycle, a supporting member for the motor secured thereto and pivotally connected to the bicycle frame in rear of the crank hanger, the motor being supported for rocking movement to carry its drive roller into and out of engagement with the rear wheel of the bicycle, a gear segment on said supporting member, a hand lever pivoted intermediate its ends to the frame and having at its lower end a gear segment meshing with the gear segment of the support, and a coiled spring connected at opposite ends with said lever and a part of the frame and acting to shift the motor into driving relation with the rear wheel.

7. The combination with a bicycle, of a motor provided with a drive roller to engage the peripheral portion of the rear wheel of the bicycle, a guide member on the seat mast of the bicycle frame, a supporting member on the motor at one side thereof, said supporting member being pivotally connected at its lower portion to the lower rear truss members of the bicycle frame near the juncture of said members in rear of the seat mast, guide plate portions on said supporting member extending along opposite sides of the guide member on the seat mast and slidably engaging said member, the motor being supported for rocking movement to carry its drive roller into and out of engagement with the rear wheel of the bicycle, and manually controlled means for shifting the motor.

8. The combination with a bicycle, of a motor provided with a drive roller to engage the peripheral portion of the rear wheel of the bicycle, a supporting member on the motor at one side thereof pivotally connected to the lower rear truss members of the bicycle frame near the juncture of said members in rear of the seat mast, the motor being supported for rocking movement to carry its drive roller into and out of engagement with the rear wheel of the bicycle, a substantially U-shaped bracket embracing the seat mast of the bicycle, and a hand lever pivoted intermediate its ends to said bracket and operatively connected at its lower end with said supporting member to shift the same.

9. The combination with a bicycle, of a motor provided with a drive roller to engage the peripheral portion of the rear wheel of the bicycle, a supporting member for the motor secured thereto and pivotally connected to the bicycle frame in rear of the crank hanger, the motor being supported for rocking movement to carry its drive roller into and out of engagement with the rear wheel of the bicycle, a substantially U-shaped bracket embracing the seat mast of the bicycle, a hand lever pivoted intermediate its ends to said bracket and operatively connected at its lower end with said supporting member to shift the same, and a coiled spring connected at one end with said lever and at its other end with said bracket, said spring acting to shift the motor into driving relation with the rear wheel.

10. The combination with a bicycle, of a motor provided with a drive roller to engage the peripheral portion of the rear wheel of the bicycle, a substantially U-shaped bracket embracing the seat mast, a supporting member for the motor secured thereto and pivotally connected to the bicycle frame in rear of the crank hanger, the motor being supported for rocking movement to carry its drive roller into and out of driving relation with the rear wheel of the bicycle, spaced guide plate portions on said motor supporting member disposed at opposite sides of said bracket and slidably engaging the same, and manually controlled means for shifting the motor.

11. The combination with a bicycle, of a motor provided with a drive roller to engage the peripheral portion of the rear wheel of the bicycle, a substantially U-shaped bracket embracing the seat mast, a supporting member for the motor secured thereto and pivotally connected to the bicycle frame in rear of the crank hanger, the motor being supported for rocking movement to carry its drive roller into and out of driving relation with the rear wheel of the bicycle, spaced guide plate portions on said motor supporting member disposed at opposite sides of said bracket and slidably engaging the same, a hand lever pivoted intermediate its ends to said bracket and operatively connected at its lower end with one of said guide plate members to shift the motor.

12. The combination with a bicycle, of an internal combustion motor provided with a drive roller to engage the circumferential portion of the rear wheel of the bicycle, said motor being pivotally mounted on the bicycle frame in rear of the crank hanger thereof for rocking movement to carry its drive roller into and out of driving relation with the rear wheel, a fuel tank on the bicycle frame, a carbureter on the bicycle frame near the motor, a flexible fuel supply connection between the carbureter and the engine intake, and manually controlled means for shifting the motor.

13. The combination with a bicycle provided with a frame including a seat mast having a forwardly curved portion intermediate its ends, and a pair of lower rear truss members extending rearwardly from the lower end of the seat mast, of a motor provided with a drive roller to engage the peripheral portion of the rear wheel of the bicycle, the motor being pivotally mounted on the lower rear truss members of the bicycle frame near the connection of said members with the seat mast in rear of the same for rocking movement to carry its drive roller into and out of engagement with the rear wheel, and manually controlled means for shifting the motor.

14. The combination with a bicycle, of a bracket attached to the seat mast, a motor provided with a drive roller to engage the peripheral portion of the rear wheel of the bicycle, the motor being pivotally mounted on the lower rear truss members of the bicycle frame near the junction of said members in rear of the seat mast for rocking movement to carry its drive roller into and out of driving relation with the rear wheel of the bicycle, spaced guide plate portions on said motor disposed at opposite sides of said bracket and slidably engaging the same, and a hand lever pivoted intermediate its ends to said bracket and operatively connected at its lower end with said motor to shift the same.

15. The combination with a bicycle having a frame including a seat mast, a lower reach bar connected at its rear end with the lower end of the seat mast, a pair of lower rear truss members extending rearwardly from the lower end of the seat mast, of a motor provided with a drive roller to engage the peripheral portion of the rear wheel of the bicycle, said motor being pivotally mounted on the lower rear truss members of the bicycle frame near the connection of said truss members with the seat mast in rear of the same for rocking movement to carry its drive roller into and out of engagement with the rear wheel, and manually controlled means for shifting the motor.

16. The combination with a bicycle having a frame including a seat mast, a lower reach bar connected at its rear end with the lower end of the seat mast, a pair of lower rear truss members extending rearwardly from the lower end of the seat mast, of a bracket on the lower rear truss members of the bicycle frame near the connection of said truss members with the seat mast in rear of the same, a motor provided with a drive roller to engage the peripheral portion of the rear wheel of the bicycle, said motor being pivotally mounted on said bracket for rocking movement relatively to the rear wheel to carry its drive roller into and out of engagement with the rear wheel, and manually controlled means for shifting the motor.

17. The combination with a bicycle having a frame including a seat mast, a lower reach bar connected at its rear end with the lower end of the seat mast, a pair of lower rear truss members extending rearwardly from the lower end of the seat mast, of a substantially U-shaped bracket on the lower rear truss members of the bicycle frame near the connection of said truss members with the seat mast in rear of the same, a motor provided with a drive roller to engage the peripheral portion of the rear wheel of the bicycle, a lug on the motor pivotally connected to said bracket between the sides thereof, said motor being supported for rocking movement relatively to the rear wheel of the bicycle to carry its drive roller into and out of engagement therewith, and manually controlled means for shifting the motor.

18. The combination with a bicycle, of an internal combustion motor provided with a drive member to engage a wheel of the bicycle, said motor being supported on the bicycle frame to be shifted relatively to a wheel of the bicycle to carry its drive member into and out of driving relation therewith, a carbureter for the motor mounted on the bicycle frame, and a flexible fuel supply connection between the carbureter and the engine intake.

19. A bicycle provided with a frame including a seat mast having a forwardly curved portion intermediate its ends, a lower reach bar connected at its rear end with the lower end of the seat mast, a pair of lower rear substantially straight truss members extending rearwardly from the lower end of the seat mast and supporting the rear wheel, and a bracket on said rear truss members near the connection of said members with the seat mast in rear of the seat mast, said bracket providing for the pivotal attachment of a motor to the frame for rocking movement relatively to the rear wheel of the bicycle.

20. The combination with a bicycle having a frame including a seat mast, a lower reach bar connected at its rear end with the lower end of the seat mast, a pair of lower rear truss members extending rearwardly from the lower end of the seat mast, of a motor provided with a drive member to engage a portion on the rear wheel of the bicycle to be driven thereby, said motor being movably mounted on the lower rear truss members of the bicycle frame near the connection of said truss members with the seat mast in rear of the same for movement to carry its drive member into and out of said driving engagement, and manually controlled means for shifting the motor.

FRED P. PETMECKY.